United States Patent
Munshi et al.

(10) Patent No.: US 10,370,463 B2
(45) Date of Patent: Aug. 6, 2019

(54) PROCESS FOR MANUFACTURING CHLORINATED POLYVINYLCHLORIDE

(71) Applicant: RELIANCE INDUSTRIES LIMITED, Mumbai, Maharashtra (IN)

(72) Inventors: Pradip Munshi, Vadodara (IN); Ajit Behari Mathur, Vadodara (IN); Ninad Deepak Ingle, Pune (IN); Pradeep Paresh Kapadia, Mumbai (IN); Raksh Vir Jasra, Vadodara (IN)

(73) Assignee: RELIANCE INDUSTRIES LIMITED, Mumbai (IN)

(*) Notice: Subject to any disclaimer, the term of this patent is extended or adjusted under 35 U.S.C. 154(b) by 13 days.

(21) Appl. No.: 15/326,796

(22) PCT Filed: Jul. 21, 2015

(86) PCT No.: PCT/IB2015/055512
§ 371 (c)(1),
(2) Date: Jan. 17, 2017

(87) PCT Pub. No.: WO2016/012937
PCT Pub. Date: Jan. 28, 2016

(65) Prior Publication Data
US 2017/0210832 A1 Jul. 27, 2017

(30) Foreign Application Priority Data
Jul. 22, 2014 (IN) .......................... 2367/MUM/2014

(51) Int. Cl.
*C08F 8/22* (2006.01)

(52) U.S. Cl.
CPC ...................................... *C08F 8/22* (2013.01)

(58) Field of Classification Search
CPC .................................. C08F 8/22; C08F 114/16
See application file for complete search history.

(56) References Cited

U.S. PATENT DOCUMENTS

| | | |
|---|---|---|
| 3,534,013 A | 10/1970 | Wakabayashi et al. |
| 4,412,898 A | 11/1983 | Olson et al. |
| 2015/0148445 A1* | 5/2015 | Ohara ............... B01J 19/121 522/132 |

FOREIGN PATENT DOCUMENTS

| | | | |
|---|---|---|---|
| GB | 1378364 A | * 12/1974 | ............... C08F 8/20 |
| WO | WO-1982002557 A1 | 8/1982 | |

OTHER PUBLICATIONS

International Search Report and Written Opinion of the ISA for PCT/IB2015/055512. ISA/Indian Patent Office, New Delhi, dated Nov. 24. 2015.

\* cited by examiner

*Primary Examiner* — Sanza L. McClendon
(74) *Attorney, Agent, or Firm* — Harness, Dickey & Pierce, P.L.C.

(57) ABSTRACT

The present disclosure provides a process for the chlorination of polyvinyl chloride. PVC obtained during the suspension polymerization reaction is directly used for chlorination without filtration, drying and re-slurrying. The present process is carried out in the absence of additional chemicals/reagents; also reheating during the chlorination reaction is not required. CPVC manufactured using the process of the present disclosure has whiteness index greater than 85, yellowness index lower than 4 and thermal stability in the range of 300 to 550 seconds at 210° C.

6 Claims, No Drawings

PROCESS FOR MANUFACTURING CHLORINATED POLYVINYLCHLORIDE

CROSS-REFERENCE TO RELATED APPLICATIONS

This application is a 371 U.S. National Stage of International Application No. PCT/162015/055512, filed Jul. 21, 2015, which application claims the benefit of and priority to Indian Patent Application No. 2367/MUM/2014, filed Jul. 22, 2014. The disclosures of the above applications are incorporated herein by reference.

FIELD

The present disclosure relates to a process for the chlorination of polyvinylchloride.

BACKGROUND

Chlorinated polyvinyl chloride (CPVC) is a thermoplastic polymer produced by chlorination of polyvinyl chloride (PVC) resin. CPVC can withstand a wider temperature range and contains more chlorine as compared to PVC. CPVC has an additional free radical chlorination process that adds chlorine to the material and increases its resiliency in terms of conveying hot materials like water.

CPVC has a wide range of applications including pipes used for hot and cold water distribution in residential and industrial use, transportation of corrosive liquids, high tension cable protection pipe and the like.

Conventionally, PVC obtained by polymerization, is filtered and dried; water is added to the dried PVC to prepare a slurry and the slurry is further used for carrying out chlorination reaction. However, the steps of filtration, washing drying and re-slurrying add up to the overall process time and the running cost. CPVC tends to degrade at higher temperatures; additives and stabilizers are used to prevent the degradation of CPVC. Hence, PVC that has got less heat exposure would be preferable for preparing CPVC.

Therefore, there is felt a need for a simple and economic process for preparation of CPVC directly from PVC.

OBJECTS

Some of the objects of the present disclosure, of which at least one embodiment is adapted to provide, are described herein below:

An object of the present disclosure is to provide a simple and economic process for the preparation of chlorinated polyvinyl chloride.

Another object of the present disclosure is to provide a process for the preparation of chlorinated polyvinyl chloride without using additional chemicals/reagents.

It is still another object of the present disclosure to ameliorate one or more problems of the conventional processes or to at least provide a useful alternative.

Other objects and advantages of the present disclosure will be more apparent from the following description which is not intended to limit the scope of the present disclosure.

SUMMARY

In accordance with the present disclosure there is provided a process for the preparation of chlorinated polyvinyl chloride, said process comprising the following steps:

polymerizing vinyl chloride in the presence of at least one dispersing agent, at a temperature in the range of 50 to 80° C. to obtain a reaction mixture;

separating unreacted vinyl chloride from said reaction mixture to obtain a slurry comprising polyvinyl chloride; and reacting said slurry with chlorine in the presence of at least one irradiation source of wavelength ranging from 254 to 530 nm, under agitation at a speed ranging from 100 to 1600 rpm, for a time period ranging from 2 to 12 hours while maintaining a temperature in the range of 50 to 80° C. to obtain chlorinated polyvinyl chloride (CPVC).

The process of the present disclosure is simple and economic. The process of the present disclosure involves polymerization of vinyl chloride to obtain a slurry comprising PVC and subjecting the slurry to chlorination to obtain chlorinated polyvinyl chloride. The process of the present disclosure does not include the steps of separation of PVC from the polymerization reaction mixture, washing, drying and re-slurrying for chlorination and therefore, saves time and lowers the running cost of the operation.

DETAILED DESCRIPTION

The disclosure will now be described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The experiments used herein are intended merely to facilitate an understanding of ways in which the embodiments herein may be practiced and to further enable those of skill in the art to practice the embodiments herein. Accordingly, the experiments should not be construed as limiting the scope of the embodiments herein.

The description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

In one aspect, the present disclosure provides a process for the preparation of chlorinated polyvinyl chloride (PVC), said process comprising the following steps:

The vinyl chloride monomers are polymerized in the presence of at least one dispersing agent at a temperature in the range of 50 to 80° C. to obtain a reaction mixture.

The unreacted vinyl chloride monomers are separated from the reaction mixture to obtain a slurry comprising polyvinyl chloride.

The slurry is reacted with chlorine in the presence of at least one irradiation source of wavelength ranging from 254 to 530 nm, under agitation at a speed ranging from 100 to 1600 rpm, for a time period ranging from 2 to 12 hours while maintaining a temperature in the range of 50 to 80° C. to obtain chlorinated polyvinyl chloride (CPVC).

In accordance with one embodiment of the present disclosure, the process of the present disclosure is carried out in the absence of the following four steps:

cooling and filtering of PVC after the polymerization reaction;

drying of the PVC obtained by the polymerization reaction;

cooling to room temp and re-slurrying of the PVC for the chlorination reaction; and reheating the reaction mixture for the chlorination reaction.

Omission of the above mentioned four steps results in reducing the running cost, manpower and time; by reducing the numbers of unit operations involved. PVC obtained by suspension polymerization need not be dried before it is used for the chlorination to formed chlorinated polyvinyl chloride (CPVC). Thus, it reduces the number of cycles; the polymer is exposed to heat treatment and the CPVC so prepared has a better thermal stability. Also, the total batch time from the polymerization of vinyl chloride monomers to the chlorination of PVC to obtain CPVC is reduced.

The Whiteness Index (WI) and the Yellowness Index (YI) are the two color parameters to judge CPVC product quality. Higher values of WI and lower values of YI indicate the better product quality, whereas lower values of WI and higher values of YI indicate poor quality of product.

In accordance with one embodiment of the present disclosure, vinyl chloride monomers are polymerized under suspension polymerization.

In accordance with one embodiment of the present disclosure, the dispersing agent is polyvinyl alcohol.

In accordance with another embodiment of the present disclosure, the dispersing agent is partially hydrolyzed polyvinyl chloride.

The polymerization of vinyl chloride is carried out at a temperature in the range of 50 to 80° C.

In accordance with one embodiment of the present disclosure, the polymerization is carried out at 70° C.

The slurry obtained during the process of the present disclosure comprises 5 to 50 wt % of PVC; preferably 15 to 30 wt %.

The vinyl chloride monomer conversion rate in the polymerization reaction in accordance with the present disclosure is not less than 87%. Unreacted vinyl chloride monomer is separated from the reaction mixture leaving behind the slurry comprising PVC and partially hydrolyzed polyvinyl alcohol.

In accordance with the present disclosure, chlorination is carried out by reacting the slurry with chlorine gas. The photo irradiation of the slurry is carried out with the radiation source having a wavelength in the range from 254 to 530 nm, preferably the irradiation is carried out using radiations having wavelength in the range of 254 to 450 nm.

During chlorination of PVC, the temperature is maintained at a temperature in the range of 50 to 80° C.

In accordance with one embodiment of the present disclosure, the chlorination of PVC is carried out at 70° C.

The PVC used directly in the present disclosure has better adsorption as compared to the conventional PVC slurry prepared using dried PVC and water.

PVA acts as a dispersing agent allowing uniform chlorination and reduces floating of CPVC during the chlorination process. Also, agglomeration of CPVC is not observed during the chlorination process. As the polymerization and chlorination reactions are carried out at a temperature ranging from 50 to 80° C., there is no need to cool the PVC formed after polymerization step. Since, chlorinated polymers are vulnerable to degradation at high temperature; PVC formed at low temperature is preferred for CPVC manufacturing.

In accordance with one embodiment of the present disclosure, the oxygen content of the slurry is less than 500 ppm.

The process of chlorinating PVC in accordance with the present disclosure does not include the steps of separation of PVC from the polymerization reaction mixture, washing, drying and re-slurrying for chlorination and therefore, saves time and lowers the running cost of the operation.

In accordance with one embodiment of the present disclosure, CPVC has whiteness index greater than 85, yellowness index lower than 4 and thermal stability in the range of 300 to 550 seconds at 210° C.

In accordance with the present disclosure, the irradiation source is selected from the group consisting of ultra violet (UV) lamps, light-emitting diodes (LEDs) and LASERs.

In accordance with the present disclosure, the irradiation source has power ranging from 0.01 to 0.04 Watt/g of PVC.

In accordance with the present disclosure, the process for the preparation of CPVC is carried out without using additional chemicals/reagents. Also, a swelling agent or higher porosity PVC is not required for better adsorption of chlorine.

In accordance with one embodiment of the present disclosure, the process of the present disclosure can be carried out without the steps involving the separation of PVC from polymerization reaction mixture, washing, drying, and re-slurrying for chlorination.

The present disclosure is further described in light of the experiments provided herein below which are set forth for illustration purpose only and not to be construed for limiting the scope of the disclosure. These laboratory scale experiments can be scaled up to industrial/commercial scale.

Experiment 1

The setup consisted of a 5 L glass reactor equipped with irradiation source into which aqueous slurry of 18 wt % PVC was added. The slurry was agitated at 800 rpm to obtain uniform slurry and simultaneously nitrogen gas was purged into the slurry to remove oxygen. The temperature of the slurry was maintained at 70° C. After 30 minutes, nitrogen purge was stopped and chlorine was purged into the slurry maintaining the same reaction conditions. Irradiation source with a wavelength at 450 nm was switched on, when the slurry and head space was saturated by chlorine. Start of irradiation was considered as the reaction start time. The reaction was monitored periodically by titrating proportional amount of mother liquor with 0.1 N NaOH. The reaction was stopped when a titer value corresponding to 67 wt % chlorination was obtained and the irradiation was switched off.

Nitrogen gas was purged for 1 hour to expel free chlorine from the slurry.

The above slurry was filtered and the filtrate comprising chlorinated polyvinyl chloride (CPVC) was washed till a neutral pH was obtained. The wet cake obtained after the washing was dried under reduced pressure at 55° C. for 2 hours. The dried powder was further neutralized using 0.0125 N Ca(OH)$_2$ at a concentration of 10 mL/g of CPVC for 10 minutes. The slurry formed after the neutralization step was filtered and washed with water at a concentration of 25 mL/g of CPVC. The CPVC obtained was dried at 70° C. for 3 hours. The CPVC obtained had a chlorine content of 67.35 wt %, Apparent Bulk Density of 0.57 g/mL, Whiteness Index of 85.54, Yellowness Index of 2.91, and Thermal stability by Conductivity of 468 seconds at 210° C.

Experiment 2

The process of experiment 1 was repeated, except that the wavelength used was 410 nm. Nitrogen purging was carried out for 45 minutes.

The CPVC obtained had a chlorine content of 67.4 wt %, Apparent Bulk Density of 0.55 g/mL, Whiteness Index of 82.39, Yellowness Index of 3.05, and Thermal stability by Conductivity of 396 seconds at 210° C.

Experiment 3

The process of experiment 1 was repeated, except that 630 g PVC powder and 4 L water was taken in 5 L reactor and the wavelength used was 410 nm. Nitrogen purging was carried out for 45 minutes.

The CPVC obtained had a chlorine content of 67.45 wt %, Apparent Bulk Density of 0.5 g/mL, Whiteness Index of 86.16, Yellowness Index of 3.25, and Thermal stability by Conductivity of 324 seconds at 210° C.

Experiment 4

The process of experiment 3 was repeated, except that the wavelength used was 450 nm. The CPVC obtained had a chlorine content of 67.44 wt %, Apparent Bulk Density of 0.56 g/mL, Whiteness Index of 86.33, Yellowness Index of 3.08, and Thermal stability by Conductivity of 504 seconds at 210° C.

Chlorinated polyvinyl chloride obtained in the above experiments has whiteness index greater than 85, yellowness index lower than 4 and thermal stability in the range of 300 to 550 seconds at 210° C.

Technical Advantages And Economic Significance

The present disclosure provides a simple and economic process for the preparation of CPVC.

The present disclosure also provides a process for the preparation of CPVC without using additional chemicals/reagents.

The present disclosure provides a CPVC with better thermal stability.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the preparation of chlorinated polyvinyl chloride (CPVC); said process comprising the following steps:
   i. polymerizing vinyl chloride in the presence of at least one dispersing agent, at a temperature in the range of 50 to 80° C. to obtain a reaction mixture, wherein the conversion of monomer is greater than 86%;
   ii. separating unreacted vinyl chloride from said reaction mixture to obtain a slurry comprising polyvinyl chloride; and
   iii. reacting said slurry with chlorine in the presence of at least one irradiation source of wavelength ranging from 254 to 530 nm, under agitation at a speed ranging from 100 to 1600 rpm, for a time period ranging from 2 to 12 hours while maintaining a temperature in the range of 50 to 80° C. to obtain chlorinated polyvinyl chloride (CPVC).

2. The process as claimed in claim 1, wherein said dispersing agent in step (i) is polyvinyl alcohol.

3. The process as claimed in claim 1, wherein said dispersing agent in step (i) is partially hydrolyzed polyvinyl alcohol.

4. The process as claimed in claim 1, wherein said irradiation source in step (iii) is selected from the group consisting of ultra violet (UV) lamps, light-emitting diodes (LEDs) and LASERs.

5. The process as claimed in claim 1, wherein said irradiation source in step (iii) has power ranging from 0.01 to 0.04 Watt/g of PVC.

6. The process as claimed in claim 1, wherein said CPVC has whiteness index greater than 85, yellowness index lower than 4 and thermal stability in the range of 300 to 550 seconds at 210° C.

* * * * *